Patented Jan. 13, 1931

1,788,608

UNITED STATES PATENT OFFICE

EUGEN ABRAMOWITSCH, OF HAMBURG, GERMANY

PROCESS AND PRODUCT FOR GLUING WOOD WITH STARCH OR SUBSTANCES CONTAINING STARCH

No Drawing. Application filed October 6, 1927, Serial No. 224,525, and in Germany October 14, 1926.

It is known to use vegetable glue for the manufacture of adhesives which, however, for instance, in Germany are not employed in the practice for the purpose of gluing wood. In other countries where vegetable glue is used for the said purpose, such as in the United States, it is not nearly used to such an extent as animal glue. The reason for the limited use may particularly be seen in the slight agglutinant efficiency of the vegetable glue, and moreover in the unsuitable procedure of gluing (cold compressing for hours) and the injurious action of the caustic alkalies corroding and coloring the wood which are added for producing or increasing the agglutinant efficiency.

Animal glue fundamentally differs from vegetable glue in its chemical composition. In the case of animal glue, such as for instance animal casein, animal albumen, leather-glue or bone-glue the agglutinant action of the proteins is fully utilized, whereas the protein-content of the vegetable glue is too small to be of any value.

Fundamental differences may also be seen in the purposes for which the adhesives are intended to be used, whether in connection with wood or with paper. In the latter case a rather small adhesive action will be sufficient, since in view of the rather loose cohesion of the paper fibres a vegetable adhesive, such as for example farinaceous adhesive paste will have a greater consistency than the fibres of an ordinary paper.

According to the process of the present invention a vegetable glue is used for the first time in connection with wood by converting the glue into a substance with sufficient adhesive action, without an addition of any caustic alkalies or acids as is customary.

When using vegetable adhesive made, for instance, of flour paste, a mass is required that spreads easily. For this purpose a colloidal solution containing about 6% starch may be suitable, which, however, due to the small content of proteins has a rather immaterial agglutinant action and is therefore not at all adapted for gluing wood. On the other hand, in case of preparing solutions containing 50% starch in a converted state, a jelly is obtained which does not allow it to be easily spread on the surface in question and the use of which is therefore rendered impracticable.

According to the method of the present invention a high concentration of the adhesive means made of a material containing starch, is obtained by applying unconverted starch to the wooden surface suitably prepared, either in a dry state or as a paste or jelly or in any other form of suspension containing about 30% starch in an unconverted state.

The substances containing starch such as potato flour, indian corn, rice, wheat, rye, etc., are then subjected to heat and pressure at a temperature of about 90° C. and pressure of 2–8 atmospheres thereby causing a conversion of the substances into a powerful adhesive having a high adhesive efficiency. Only after the conversion has taken place the advantages of the process according to this invention in view of previous methods are brought about. Merely due to the said conversion the vegetable glue becomes fit for being used in connection with wood. The treatment of the starch at a temperature of about 60° C., viz. at a temperature causing the molecules of the various kinds of starch to be destroyed will not be sufficient to produce, in conjunction with carbohydrates, an efficient glue. A higher temperature of about 90° C. is required so as to enable a conversion of the starch into an adhesive adapted to be employed for gluing wood.

The process of the present invention is carried out by applying starch or starch-containing substances to the surface of the wood at an indoor temperature about 18° C., either in a dry state or, if desired, as a pasty mass, jelly, viscous fluid, mucilage or in any other, suspension and the like, if required, mixed with additional substances, such as trioxymethylene or a netural salt, for example magnesium chloride. The surfaces of the wood thus treated are then exposed to a pressure of about 2–8 atmospheres and heated at a temperature of about 90° C. whereupon the two surfaces will adhere to one another in a very short time.

As specific examples of my invention.

1. 8 kilos of potato-flour are mixed with 15 kilos of water to furnish a milky solution. 50 gr. magnesium chloride are then added thereto and the whole mixed with 500 gr. tragacanth and 2 liter water.

2. 4 kilos of rice-flour are mixed with 4 kilos of rye-flour and the mixture mixed with 17 kilos of cold water.

3. 8 kilos of corn flour are mixed with 17 kilos of water, 50 gr. trioxymethylene and 500 gr. dextrine, at ordinary temperature.

Such mixtures are applied to the surface of the wood by means of any well-known spreading device. The veneers after being laid in contact with each other are then put under a compressive device which is heated to about 90° Celsius and quickly closed with a pressure of 2 to 8 atm. An adhesive substance is produced thereby and causes the two surfaces to become permanently joined together.

What I claim is:—

1. A process for gluing wood with an aqueous composition starch containing substances which consists in applying the starch-containing substances in an unconverted state to the wooden surfaces to be glued together, and then converting the said substances into a powerful adhesive under pressure and heat at a temperature of about 90° C.

2. A process as claimed in claim 1, in which the aqueous composition starch containing substances are used in admixture with trioxymethylene.

3. A process for gluing wood which comprises applying to the surfaces of the wood to be joined an aqueous composition including unconverted starch, uniting the surfaces and putting the joined surfaces under heat and pressure.

4. The process of gluing wood surfaces which comprises coating the surfaces to be joined with an aqueous composition including starch and trioxymethylene uniting the surfaces to be joined and placing them under heat and pressure.

5. The process as in claim 3 in which the pressure is about 2 to 8 atmospheres and the temperature is about 90° C.

6. The process as in claim 4 in which the pressure is about 2 to 8 atmospheres and the temperature is about 90° C.

7. An adhesive comprising the product of heating an aqueous composition including unconverted starch to a temperature of 90° C. under a pressure of about 2 to 8 atmospheres.

8. An adhesive comprising the product of heating an aqueous composition including unconverted starch and trioxymethylene to a temperature of about 90° C. under a pressure of about 2 to 8 atmospheres.

In testimony whereof I affix my signature.

Dr. EUGEN ABRAMOWITSCH.